(12) United States Patent
Reyna (10) Patent No.: US 9,645,258 B1
(45) Date of Patent: May 9, 2017

(54) SEGMENTED SCINTILLATION ANTINEUTRINO DETECTOR (71) Applicant: Sandia Corporation, Albuquerque, NM (US)

(72) Inventor: David Reyna, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 275 days.

(21) Appl. No.: 14/553,792

(22) Filed: Nov. 25, 2014

(51) Int. Cl.
*G01T 1/20* (2006.01)
*G01T 1/208* (2006.01)

(52) U.S. Cl.
CPC .............. *G01T 1/20* (2013.01); *G01T 1/208* (2013.01)

(58) Field of Classification Search
CPC .......................................... G01T 1/20–1/2047
See application file for complete search history.

(56) References Cited

U.S. PATENT DOCUMENTS 5,968,425 A * 10/1999 Bross ..................... C09K 11/06
252/301.17
2016/0195622 A1* 7/2016 Fischbach ............. G01T 1/1606
250/395

OTHER PUBLICATIONS

Kiff et al. "Neutron Detection and Identification Using ZnS:Ag/6LiF in Segmented Antineutrinodetectors," Nuclear Instruments and Methods in Physics Research A 652 (2011) 412-416.*

A. Bernstein, et al., "Monitoring the Thermal Power of Nuclear Reactors with a Prototype Cubic Meter Antineutrino Detector", Journal of Applied Physics, Apr. 2008, pp. 1-10 (2008).
N. S. Bowden, et al., "Observation of the Isotopic Evolution of Pressurized Water Reactor Fuel Using an Antineutrino Detector", Journal of Applied Physics, vol. 105, Issue 6, Mar. 2009, pp. 1-9 (2009).
A. Bernstein, et al., "Nuclear Security Applications of Antineutrino Detectors: Current Capabilities and Future Prospects", Science and Global Security, 2010, vol. 18, Issue 3, pp. 127-192 (2010).

(Continued)

*Primary Examiner* — Casey Bryant
(74) *Attorney, Agent, or Firm* — Medley, Behrens & Lewis, LLC (57) ABSTRACT

The various technologies presented herein relate to incorporating a wavelength-shifting material in a scintillator to facilitate absorption of a first electromagnetic particle (e.g., a first photon) having a first wavelength and subsequent generation and emission of a second electromagnetic particle (e.g., a second photon) having a second wavelength. The second electromagnetic particle can be emitted isotropically, with a high probability that the direction of emission of the second electromagnetic particle is disparate to the direction of travel of the first electromagnetic particle (and according angle of incidence). Isotropic emission of the second electromagnetic particle enables the second electromagnetic particle to be retained in the scintillator owing to internal reflection. Accordingly, longer length scintillators can be constructed, and accordingly, the scintillator array has a greater area (and volume) over which to detect electromagnetic particles (e.g., antineutrinos) being emitted from a nuclear reaction.

20 Claims, 3 Drawing Sheets

(56) References Cited

OTHER PUBLICATIONS

S. D. Kiff, et al., "Integrated Readout of Organic Scintillator and ZnS:Ag/6LiF for Segmented Antineutrino Detectors", Nuclear Science Symposium Conference Record (NSS/MIC)—2010 IEEE, pp. 431-435 (2010).

D. Reyna, et al., "Advances Toward a Transportable Antineutrino Detector System for Reactor Monitoring and Safeguards", Advancements in Nuclear Instrumentation Measurement Methods and their Application (ANIMMA)—IEEE, 2nd Int. Conference, Jun. 2011, pp. 1-5 (2011).

* cited by examiner

SEGMENTED SCINTILLATION ANTINEUTRINO DETECTOR

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Antineutrino production in a nuclear reactor can result from the fission of uranium (U) and plutonium (Pu) atoms, whereby antineutrinos result from the beta-decay of neutron-rich fragments of the respective atoms. On average, each fission reaction can produce approximately six antineutrinos. Hence, as a result, a typical nuclear power reactor can produce approximately $10^{22}$ antineutrinos per second. Monitoring of the antineutrino production rate can provide a direct measurement of the number of atoms undergoing fission, and accordingly, the thermal power and operational status of a reactor.

Detection of reactor-induced antineutrinos is usually performed through the inverse beta-decay process. In this charged current interaction, an antineutrino ($\bar{\nu}$) interacts with a quasi-free proton (p) in a hydrogenous material. The interaction results in final-state products of a positron ($e^+$) and a neutron (n), e.g., $\bar{\nu}+p \rightarrow e^+ +n$, whereby the presence and/or existence of the positron and the neutron can be detected. The presence of a positron and an associated neutron (e.g., the positron and neutron co-exist as a function of the interaction of the antineutrino and the proton) can act as a signature of the prior existence of an antineutrino. The cross-section for this process is small ($\sim 10^{-42}$ cm$^{-2}$). However, a combination of the large flux of antineutrinos from a nuclear reactor and a moderately sized detector (a cubic meter scale detector contains $\sim 10^{28}$ target protons) can result in several thousand interactions per day at a standoff of 10-50 meters, which is sufficient to provide a monitoring capability.

A concern when attempting to detect antineutrinos is the large background signals generated by cosmogenic radiation (e.g. neutrons, muons, pions, gamma rays, etc.) which are produced in the earth's atmosphere. Accordingly, an approach to overcome such background radiation is to locate the monitoring system underground, and hence, reduce the number of signals being generated by background electromagnetic particles and accordingly, increase the sensitivity to signals being generated by the antineutrinos which exist as a function of the nuclear fission reactions. However, operation of such subterranean monitoring systems can be costly, operationally inflexible, and difficult to maintain.

SUMMARY

The following is a brief summary of subject matter that is described in greater detail herein. This summary is not intended to be limiting as to the scope of the claims.

Various exemplary embodiments presented herein relate to detection of electromagnetic particles, and particularly, antineutrino particles generated by a fission process occurring in a nuclear reactor.

One or more scintillators are utilized to capture electromagnetic particles, whereby the capture process can involve a wavelength-shifting operation. Accordingly, a first electromagnetic particle (e.g., a first photon) which is emitted into the scintillator from an external source can interact with a wavelength-shifting material included in the scintillator. The first electromagnetic particle can be absorbed by the wavelength shifting material and, subsequently, a second electromagnetic particle (e.g., a second photon) can be generated and emitted by the wavelength shifting material.

In an aspect, the first electromagnetic particle can have a direction of travel such that the first electromagnetic particle enters the scintillator with a particular angle of incidence with respect to an external surface of the scintillator. The angle of incidence also enables the first electromagnetic particle to leave the scintillator and hence is not detected by a photomultiplier tube attached to the scintillator. By absorbing the first electromagnetic particle and emitting a second electromagnetic particle isotropically, the direction of the second photon is completely random. With the random direction of emission, the probability of the second electromagnetic particle having the same direction of travel as the first electromagnetic particle is statistically low. Accordingly, the second electromagnetic particle remains in the scintillator, and as a function of internal reflection inside the scintillator, the second electromagnetic particle travels to the photomultiplier tube to be detected.

In an embodiment, the first electromagnetic particle can have a wavelength in the blue portion of the electromagnetic spectrum and the second electromagnetic particle can have a wavelength in the green portion of the electromagnetic spectrum.

The internal reflection of the second electromagnetic particle enables a longer scintillator to be constructed, whereby the length of the scintillator is only limited by an attenuation length of the second electromagnetic particle. Hence, by utilizing longer scintillators the ability to detect antineutrinos is enhanced compared with conventional, shorter scintillators that only detect the first electromagnetic particle.

A scintillator can be surrounded with screens which comprise a material that generates a photon when an electromagnetic particle is incident upon the screen. In an embodiment, the screen material can be a lithium-doped scintillator, which can include zinc sulphite. In accordance with the various particle decays, particle generations, particle emissions, etc., as further described herein, when a neutron is incident upon the lithium-doped portion of the scintillator, it can be captured by a lithium atom and at least one of an alpha particle and/or a tritium particle (e.g., an isotope), also known as triton, can be formed. Subsequently, when the alpha particle and/or the tritium particle is incident upon the zinc sulphite in the screen, a first photon (e.g., a first electromagnetic particle) having a first wavelength can be emitted from the screen into the scintillator. The first photon can interact with wavelength-shifting material in the scintillator resulting in absorption of the first photon and generation of a second photon (e.g., a second electromagnetic particle) having a second wavelength. Owing to the isotropic emission of the second photon, the second photon remains trapped inside the scintillator and travels to a photomultiplier tube to be captured.

A plurality of scintillators, and accompanying screens, can be combined into a single scintillator array, with a photomultiplier located at either end of the scintillator array. Hence, in an aspect of detecting antineutrinos, 'back-to-back' gamma rays can be generated in a first scintillator and their presence detected (e.g., as a function of the gamma ray(s) undergoing energy deposition) in at least a second scintillator in the array. Accordingly, the various embodiments presented herein can maximize detection of antineutrinos as a function of increased length of the respective scintillators and further, forming an array of scintillators to increase the overall volume of scintillator material and material comprising the screens which separate the respective scintillators in the scintillator array.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to detecting electromagnetic particles are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Figure 1:
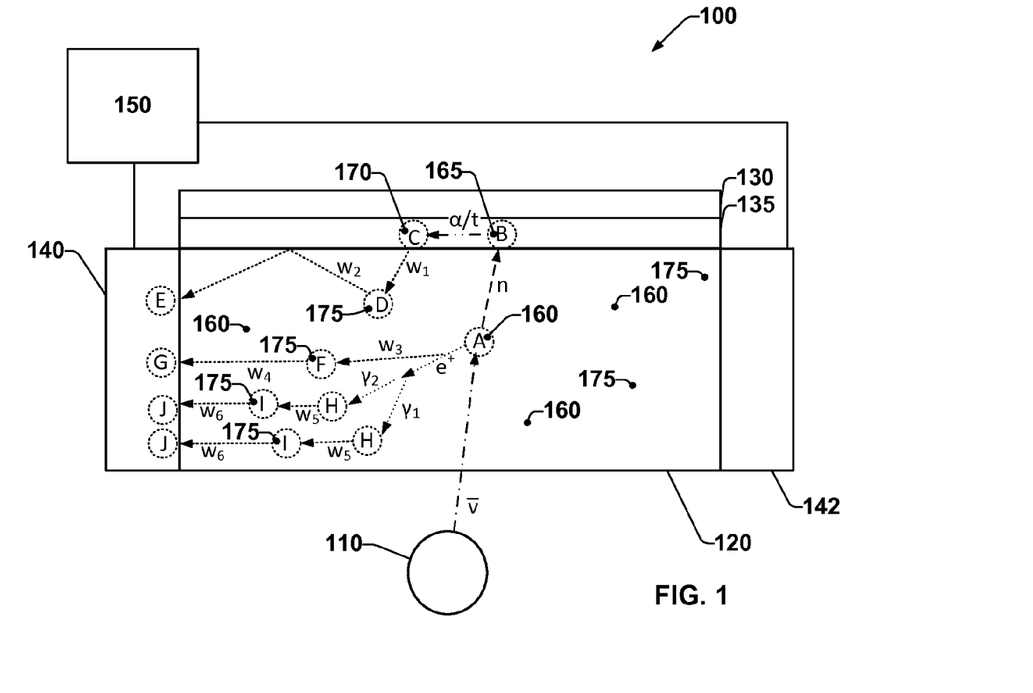
FIG. 1 is a block diagram illustrating exemplary embodiments for wavelength-shifting electromagnetic particles.

FIG. 1 illustrates an antineutrino detector 100. In an embodiment, the antineutrino detector 100 can be utilized to detect one or more antineutrinos generated by a nuclear reactor 110. The antineutrino detector 100 can include a scintillator 120 which can be utilized to detect the presence of one or more electromagnetic particles based upon a scintillation operation, e.g., a photoluminescence process involving absorption and/or emission of energy in the form of one or more electromagnetic particles, as further described below. In an embodiment, the scintillator 120 can be a three-dimensional shape, such as a cuboid, a rectangular cuboid, etc.

Located proximate to the scintillator 120 is a screen 130, whereby the screen 130 can be constructed from any suitable material. For example, the screen 130 can be formed from aluminum. The screen 130 can have formed thereon a layer 135 of material which can absorb one or more electromagnetic particles and in response to the absorption, subsequently emit one or more electromagnetic particles, as further described herein. In an embodiment, the layer 135 can be formed from material comprising a lithium-doped scintillator, such as lithium-doped zinc sulphite, ZnS:Ag/$^6$LiF (alternatively expressed as $^6$LiF(ZnS:Ag)). In an aspect, $^6$Li has a high cross-section for neutron capture, as further described below. The screen 130, and layer 135, can be located directly on the scintillator 120 such that the exposed surface of layer 135 touches an outer surface of the scintillator 120. Hence, a photon, or other electromagnetic particle generated by the layer 135 can be emitted into the scintillator 120 and, as described further herein, as a function of internal reflection by the outer long surfaces of the scintillator 120, the photon can remain trapped inside the scintillator 120.

In another embodiment, a couplant can be utilized between the surface of layer 135 and the outer surface of scintillator 120 to facilitate transmission of a photon from the layer 135 into the scintillator 120.

In an alternative embodiment, while not shown, the screen 130 and, accordingly, layer 135, can be positioned near to the outer surface of the scintillator 120 but with a small gap between the surface of layer 135 and the outer surface of the scintillator 120. The small gap can comprise air or other transparent material to facilitate isolation (i.e., no direct optical coupling) of the layer 135 and the outer surface of the scintillator 120.

In a conventional system, an electromagnetic particle (e.g., a photon) emitted from a screen layer can enter a scintillator as a function of the angle of incidence of the electromagnetic particle relative to the surface of the scintillator. However, the same angle of incidence of the electromagnetic particle can also allow the electromagnetic particle to travel through the body of the scintillator material and out the opposite surface of the scintillator, whereupon the electromagnetic particle can be readily absorbed by a screen layer located adjacent to the opposite surface. Hence, it can be a challenge to detect the presence of the emitted electromagnetic particle in the scintillator.

In accordance with the various embodiments presented herein, a photon, or other electromagnetic particle generated by the layer 135 can be emitted into the scintillator 120, and based upon a combination of absorption of the photon (or other electromagnetic particle) and subsequent isotropic emission of a wavelength shifted electromagnetic particle, the electromagnetic particle can be retained inside of the scintillator 120.

Figure 2:
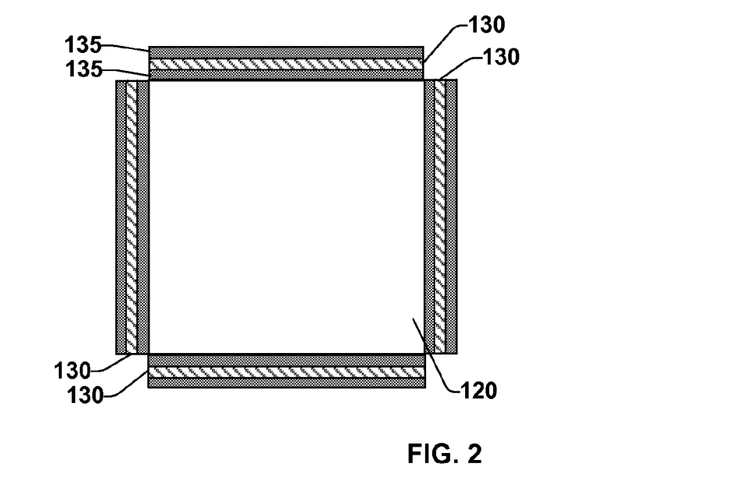
FIG. 2 is a block diagram illustrating an arrangement for a scintillator and adjacent screens.
Figure 3:
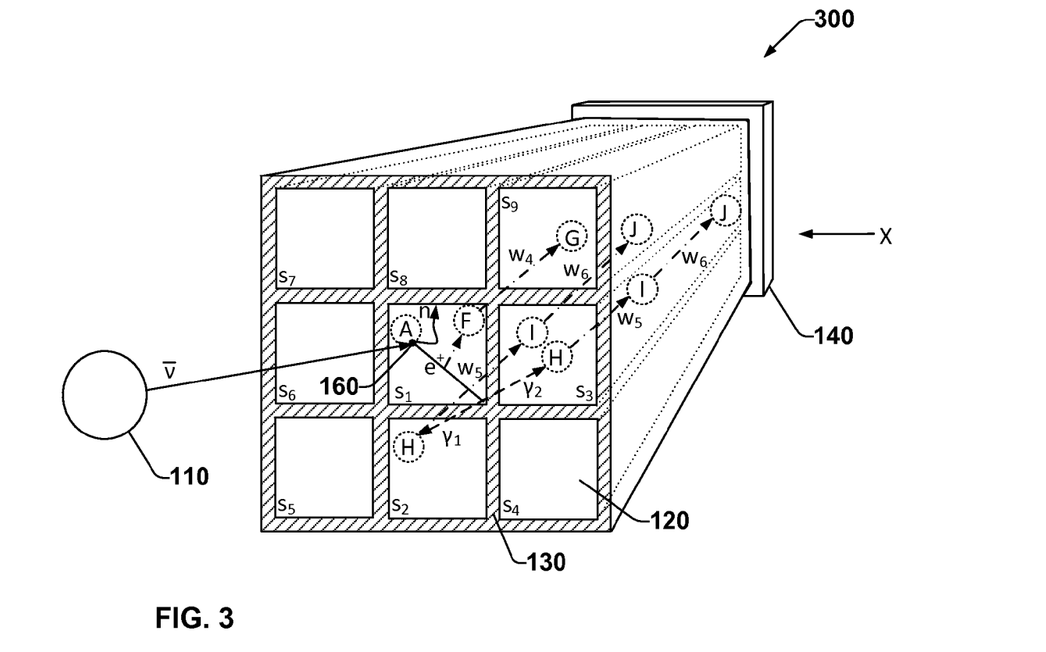
FIG. 3 is a block diagram illustrating a scintillator array.

It is to be appreciated that while only one screen 130 is illustrated in FIG. 1, all four of the long sides of the scintillator 120 can have a screen 130 located thereon, as shown in FIG. 2. Each screen 130 can have one or more associated layers 135, where a plurality of scintillators 120 are combined to form an array (per. FIG. 3), each respective layer 135 can be located against, or near, a surface of a scintillator 120.

Returning to FIG. 1, a photomultiplier tube (PMT) 140 (e.g., a first PMT) can be located proximate to a first end of the scintillator 120, with the PMT 140 absorbing one or more electromagnetic particles being emitted from the scintillator 120 at the first end. A second PMT 142 can be located at the second, opposite, end of the scintillator 120 to facilitate detection of one or more electromagnetic particles which travel in the direction of the PMT 142. Electrical energy (e.g., particle signatures) generated by either of the PMT 140 or the PMT 142 in response to one or more electromagnetic particles being incident upon either PMT 140 and/or PMT 142 can be analyzed at a data acquisition system 150. Data acquisition system 150 can include desired electronic processing and computational equipment (e.g., a processor and memory) to execute monitoring software, algorithms, etc., to facilitate determination of a presence of an antineutrino particle or other electromagnetic particles as further described herein. For example, by determining a timing between an existence of a first electromagnetic particle (e.g., a positron) and an existence of a second electromagnetic particle (e.g., a neutron) it is possible to identify whether the first electromagnetic particle was produced as a function of an antineutrino interacting with a proton in a scintillator material, or the neutron is a result of background (e.g., atmospheric) radiation.

As further described herein, the scintillator 120, the screen 130, and the PMTs 140 and 142 can be portable and accordingly, can be located proximate to the nuclear reactor 110. For example, the scintillator 120, the screen 130, and the PMTs 140 and 142 can be combined to form a portable device which can be placed on the back of a vehicle (or a trailer, etc.) and positioned (e.g., the vehicle is parked) adjacent to the nuclear reactor 110, whereby antineutrinos emitted from the nuclear reactor 110 can be captured by the scintillator 120 and/or the screen layer 135. Hence, rather than having a statically located, subterranean antineutrino detecting system, the various embodiments presented herein facilitate mobile operation and location of an antineutrino detector 110, and accordingly, the antineutrino detector 110 can be moved from a first location (e.g., a first nuclear reactor) to a second location (e.g., a second nuclear reactor).

In an embodiment, the scintillator 120 can be formed from material comprising a plurality of types of molecules and/or elements. As previously mentioned, the scintillator 120 can be formed from a material comprising a high volume of protons 160 available for interaction with one or more antineutrinos ($\bar{v}$) being emitted by the nuclear reactor 110. Hence, the scintillator 120 can be formed from hydrogenous material, a hydrocarbon material, etc. In an aspect, the hydrogenous material can be in a solid state, a liquid state, or a combination thereof. For example, the hydrogenous material can be an organic material (e.g., a polymer). In another example, the hydrogenous material can be water. In an aspect, a polymer scintillator (e.g., as included in the scintillator 120) can be utilized to detect electromagnetic interactions (e.g., presence of gamma rays and electrons), however the polymer scintillator may or may not be able to detect the presence of neutrons. By incorporating the lithium-doped inorganic scintillator material (e.g., layer 135) into the screen 130, the presence of neutrons can be detected. Hence, as further described herein, it is possible to simultaneously record electromagnetic interactions in the scintillator 120 and identify a neutron capture event(s) occurring in the screen 130.

The scintillator 120 can include a wavelength shifting (WLS) material 175 which when impacted by a first electromagnetic particle generates a first photon having a first wavelength. Depending upon how the scintillator 120 is manufactured, material forming the scintillator 120 (e.g., a hydrogenous polymer) can be doped with the WLS material 175. In an aspect, the WLS material 175 can facilitate a wavelength shift in one or more photons being transmitted through and/or by the scintillator 120. For example, upon being impacted by a first photon (or other electromagnetic radiation) having a first energy and/or wavelength (e.g., photon $w_1$) the WLS material 175 can absorb the first energy conveyed by the first photon, and subsequently generate and emit a second photon (e.g., photon $w_2$, or other electromagnetic radiation) having a second energy and/or wavelength. In an aspect, the first photon can have a wavelength ($\lambda$) in a first portion of the electromagnetic spectrum (e.g., $\lambda$=about 440-500 nm, blue light portion of the visible spectrum), while the second photon can have a wavelength in a second portion of the electromagnetic spectrum (e.g., $\lambda$=about 520-565 nm, green light portion of the visible spectrum).

As previously mentioned, the photon $w_1$ can be emitted from the layer 135 into the scintillator 120. If no WLS material 175 was present in the scintillator, the photon $w_1$ could pass through the scintillator 120 without detection, as an angle of incidence of the photon $w_1$ into the scintillator 120 can also allow the photon $w_1$ to exit the scintillator 120. However, by incorporating the WLS material 175, the photon $w_1$ can be absorbed and a second photon emitted isotropically, and hence the direction of the second photon is completely random. With the random direction of emission, the probability of the second photon having the same direction of travel as the first photon is statistically low. For any direction of emission of the second photon, except for a direction related to the angle of incidence direction, the second photon is internally reflected within the scintillator 120 to finally be captured at a PMT (e.g., PMT 140).

Hence, the operational length of a conventional scintillator which operates based on attempting to capture photon $w_1$ is limited owing to a PMT having to be placed local to the point at which the photon $w_1$ is emitted into the scintillator. However, by incorporating wavelength-shifting material (e.g., the WLS material 175 which can be a dopant) into a scintillator (e.g., scintillator 120), the first photon can interact with the wavelength-shifting material causing the first photon to be absorbed, and a second photon (e.g., having a second wavelength) to be generated, whereby the second photon has a different direction of travel to the first photon, the second photon is internally reflected along the scintillator, and accordingly the operational length of the scintillator which includes the wavelength-shifting material can be longer than the operational length of the conventional scintillator.

When utilizing a wavelength-shifting scintillator, the light in the scintillator can be shifted from a first wavelength of a photon $w_1$ to a second wavelength of a photon $w_2$ (e.g., photon $w_1$ is absorbed to generate photon $w_2$). Owing to internal capture and reflection of the photon $w_2$, the overall length of the scintillator is a function of the length of internal reflection of the photon $w_2$ prior to energy loss from attenuation. In an aspect, the second wavelength can have an attenuation distance of, for example, about 1 meter (m), and accordingly, the overall length of the scintillator can be increased to 2 m. Hence, the wavelength-shifting scintillator can facilitate an increase in detection of antineutrinos as the length (and according volume) of the scintillator 120 is longer than a conventional scintillator.

The following, with reference to FIG. 1, presents an exemplary embodiment for generation and capture of various electromagnetic particles to facilitate determination of operation of the nuclear reactor 110. In the embodiment, an antineutrino ($\bar{v}$) is emitted from the nuclear reactor 110. The antineutrino interacts with a proton 160, which in accordance with the previously presented process $\bar{v}+p \rightarrow e^+ +n$, a positron ($e^+$) and a neutron (n) can be formed and respectively emitted (as shown at interaction A). In an aspect, as shown at interaction B, the emitted neutron is captured by the Li 165 in layer 135, whereby an alpha particle ($\alpha$) and tritium (t) are generated. At interaction C, the alpha particle and/or the tritium can interact with and be absorbed by the ZnS 170 in layer 135, whereby, in response to the interaction, a first photon $w_1$ can be generated, and transmitted from the layer 135 into the material body of scintillator 120. At interaction D, the first photon $w_1$ can be incident upon the WLS material 175, whereby, as previously described, the first photon $w_1$ can be absorbed by the WLS material 175. Subsequently, the WLS material 175 can generate and emit a second photon $w_2$, whereby, the second photon $w_2$ has a different wavelength to the first photon $w_1$ and a different angle of travel, and hence is internally reflected along the scintillator 120. As shown at interaction E, the second photon $w_2$ can be detected by the PMT 140.

Returning to interaction A, as previously mentioned, a positron (e+) can also be generated and emitted as a function of the interaction between the antineutrino $\bar{v}$ and the proton 160. A positron produced inside the scintillator 120 can initially deposit its kinetic energy (e.g., typically in less than about 1 cm travel distance) via an ionization process emitting a third photon, $w_3$. The third photon, $w_3$ can be absorbed by WLS material 175, and a fourth photon, $w_4$ can be emitted by the WLS material 175, (per interaction F) which can be detected by the PMT 140.

Furthermore, subsequent annihilation of the position (electron-positron combination) can produce "back-to-back" gamma rays ($\gamma$). The gamma rays thereformed can travel about 5-20 cm through the scintillator 120 with a subsequent deposition of their energy (e.g., of up to 511 keV). The deposition of the gamma rays can cause another electromagnetic particle(s) to be formed, e.g., respective fifth photons, $w_5$, per interactions H. Subsequently, the fifth photons $w_5$, can be absorbed by WLS material 175, and a sixth photon, $w_6$ can be emitted by the WLS material 175, (per interaction I). The sixth photons $w_6$, can be detected by the PMT 140, as shown by interactions J.

Turning to FIG. 3, an antineutrino detector 300 is presented. FIG. 3 illustrates a plurality of components which are depicted in FIG. 1, whereby the antineutrino detector 300 illustrates nine scintillators 120 (e.g., $s_1$-$s_9$) being utilized in combination as a 3×3 scintillator array. It is to be appreciated that any number of scintillators 120 can be utilized in combination, e.g., n×n scintillators (where n is a positive integer), n×y scintillators (where n and y are positive integers), etc. As shown in FIG. 3, the array of scintillators 120 are separated by a plurality of screens 130 (and layers 135, not shown), and further, a PMT 140 is located at one end of the array of n×n scintillators 120. While not shown, it is to be appreciated that another PMT (e.g., PMT 142) can be located at the end of the n×n scintillators 120 opposite to the PMT 140.

Further, while the PMT 140 is illustrated as comprising of a single PMT, each scintillator 120 in the array of scintillators 120 can have its own pair of scintillators connected thereto. For example, scintillator $s_7$ can operate with a first pair of PMTs (e.g., one PMT at each respective end of the scintillator $s_7$) and scintillator $s_9$ can operate with a second pair of PMTs (e.g., one PMT at each respective end of the scintillator $s_9$).

Furthermore, antineutrino detector 300 (and similarly components 120, 130, 135, 140 and 142 of antineutrino detector 100) can be sealed into a light tight enclosure (not shown), with PMT 140 (and PMT 142) electrically coupled to a data acquisition system (e.g., a data acquisition system 150).

The scintillators 120 can be of any suitable dimension and cross section. For example, a scintillator 120 can have a width of about 1" to 6". In an embodiment, each of the scintillators 120 (e.g., any of $s_1$-$s_9$) can have a cross-sectional dimension of about 5"×5" (e.g., about 12.7 cm×about 12.7 cm). Further, the length of the scintillators 120 can be based at least in part on the attenuation distance of the second photon, $w_2$, emitted by the wavelength-shifting material (e.g., first WLS material 175). For example, the length can be about 60 cm, about 1 m, about 2 m, etc. Furthermore, the screens 130 can be of sufficient dimension to facilitate coverage of a respective surface of a scintillator. For example, based on the previously mentioned dimensions for a scintillator 120, a screen 130 can have a width of about 5" (e.g., about 12.7 cm) and a length of about 1 m. In another aspect, the scintillators 120 can have a cross-sectional shape that can facilitate close packing of the scintillators 120 in a scintillator array. For example, while FIG. 3 illustrates scintillators $s_1$-$s_9$ having a square cross-section, the cross-section can also be triangular, rectangular, hexagonal, or other close-packed facilitating shape.

As previously mentioned, as part of the process of detecting an antineutrino being emitted by the nuclear reactor, the antineutrino can interact with a proton 160, whereby the interaction can result in the generation of a positron. The position can subsequently annihilate to form "back-to-back" gamma rays $\gamma_1$ and $\gamma_2$. Based upon the dimensions of the respective scintillators (e.g., scintillators $s_1$, $s_2$, or $s_3$), the gamma rays $\gamma_1$ and $\gamma_2$ can travel to an adjacent scintillator, per the interactions H, shown in FIG. 3. For example, $\gamma_1$ while being generated in a first scintillator $s_1$, $\gamma_1$ travels through to the second scintillator $s_2$, via the intermediate portion of screen 130. Further, $\gamma_2$ while also being generated in the first scintillator $s_1$, $\gamma_2$ travels through to the third scintillator $s_3$, via the respective intermediate portion of screen 130. At interaction H, the gamma rays $\gamma_1$ and $\gamma_2$ deposit their respective energy which can cause a pair of photons (e.g., photons having a fifth wavelength $w_5$) to be generated. At interaction I, the pair of photons can subsequently interact with WLS material 175 in the respective scintillator 120 to form respective photons (e.g., photons having a sixth wavelength $w_6$), the $w_6$ photons can be detected by the PMT 140 (or PMT 142). Hence, a photon having a fourth wavelength, $w_4$, (e.g., formed at interaction F) can be detected by the PMT (e.g., associated with scintillator $s_1$) at interaction G. And further, owing to the travel of gamma rays $\gamma_1$ and $\gamma_2$ into respective scintillators $s_2$ and $s_3$, a pair of photons having sixth wavelengths, $w_6$, can be respectively detected by each PMT respectively attached to scintillators $s_2$ and $s_3$.

The various embodiments presented herein can be utilized to enhance rejection of background events through the use of unambiguous particle identification (PID) of the final-state positron and neutron. For example, the formation of the positron and the subsequent formation of the gamma rays can occur over such a short duration that they can be virtually indistinguishable in any single volume detector (e.g., an antineutrino detector comprising of a single scintillator 120). However, by forming an array of scintillators (e.g., a "segmented" scintillator detector, as shown in FIG. 3) the positron can be identified via a topological selection due to the fact that the annihilation gammas (e.g., having an energy of 511 keV) will tend to travel about 5-20 cm and, accordingly, can deposit energy in a neighboring scintillator segment. Hence, by detecting the positron and gamma rays in two or more scintillators (e.g., adjacently located) it is possible to perform PID and accordingly constrain positron candidate selection. Furthermore, by identifying a potential occurrence of a positron, a time constraint can be applied (e.g., within about 400 micro-seconds) between any two energy depositions in which a first energy deposition satisfies a positron PID and the second energy deposition satisfies a neutron PID, defined as an event identified as arising from a neighboring scintillator and associated screen layer.

In an aspect, conventional antineutrino detectors are unable to perform PID, and uncorrelated background events (e.g., ambient neutrons, etc.) can only be estimated through statistical processes which are subsequently applied to a candidate antineutrino event sample. With a segmented scintillator detector system (per FIG. 3, antineutrino detector 300) uncorrelated background events can be measured by constructing an event definition in which the time ordering of the positron and neutron candidate selections can be defined as: a first energy deposition that satisfies the neutron PID and a second energy deposition that satisfies a positron PID.

Figure 4:
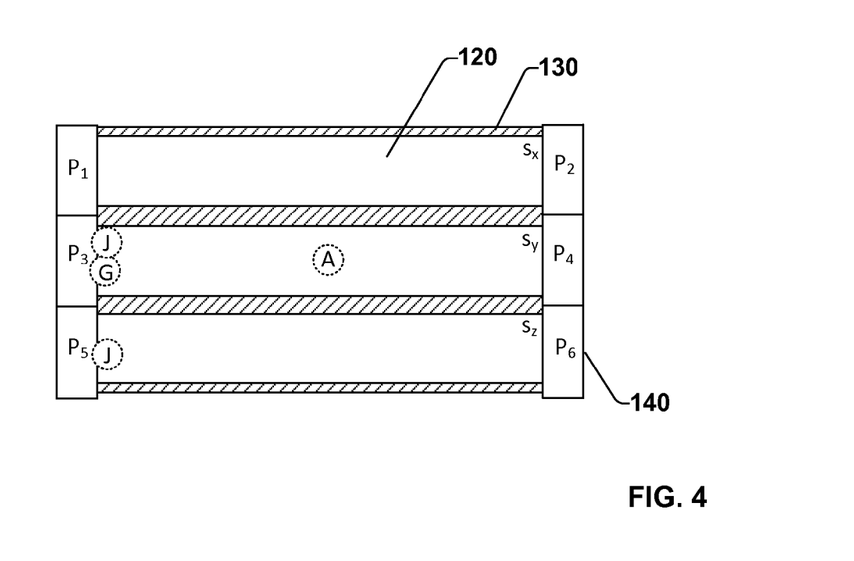
FIG. 4 is a block diagram illustrating a scintillator array.

FIG. 4 presents a sideview of a 3×n array (e.g., in direction X of FIG. 3), whereby FIG. 4 illustrates each scintillator 120 (e.g., scintillators $s_x$, $s_y$, and $s_z$) having a pair of PMTs 140 associated therewith. For example, scintillator $s_x$ has PMTs $P_1$ and $P_2$ attached, scintillator $s_y$ has PMTs $P_3$ and $P_4$ attached, and scintillator $s_z$ has PMTs $P_5$ and $P_6$ attached. Each respective pair of scintillators can be utilized to detect photons in the scintillator to which they are attached. For example, based upon the previously described interactions, an interaction A can occur in scintillator $s_y$, with subsequent detection of interactions G and J occurring in scintillator $s_y$ (e.g., at PMT $P_3$). A corresponding interaction J can also occur in an adjacent scintillator, e.g., scintillator $s_z$ (e.g., at PMT $P_5$).

Figure 5:
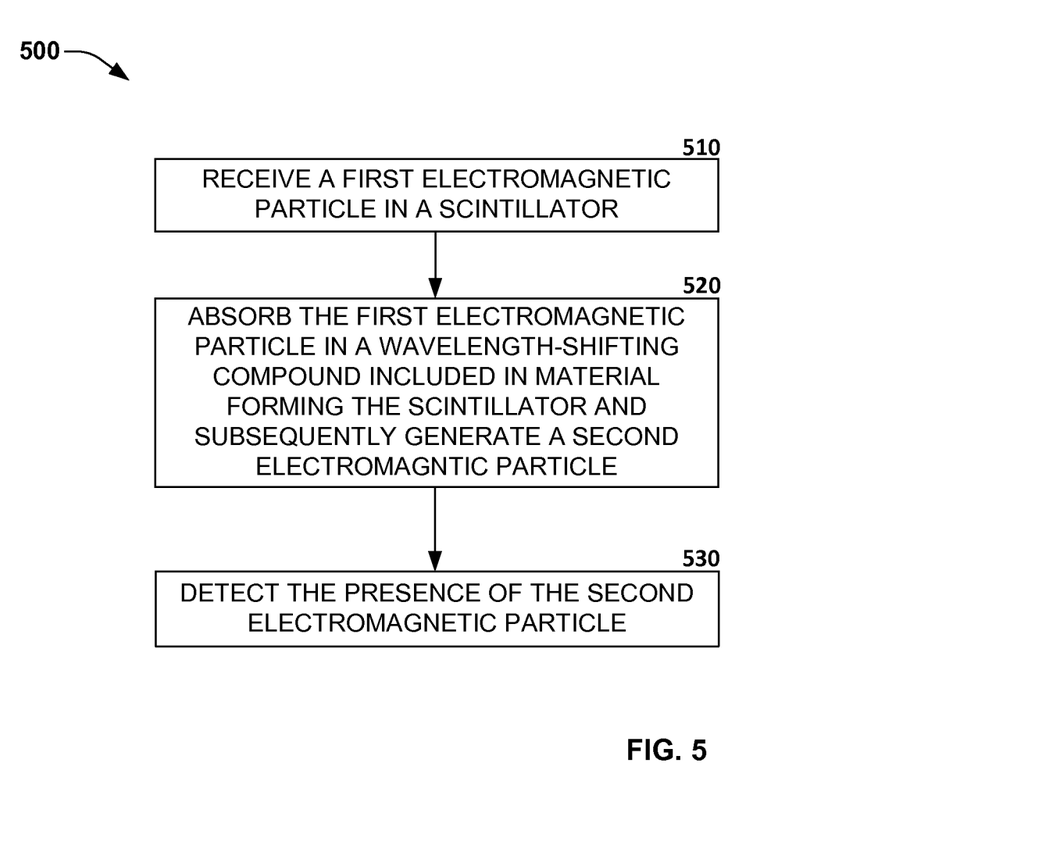
FIG. 5 is a flow diagram illustrating an exemplary methodology for wavelength-shifting electromagnetic particles.

FIG. 5 illustrates an exemplary methodology relating to wavelength-shifting of electromagnetic particles. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

FIG. 5 illustrates an exemplary methodology 500 for wavelength-shifting electromagnetic particles. At 510 a first electromagnetic particle can be received in a scintillator. In an embodiment, the first electromagnetic particle can be formed external to the scintillator and is emitted into the material forming the scintillator. In an aspect, the first electromagnetic particle can enter the scintillator with a particular angle of incidence to an external surface of the scintillator.

At 520 the first electromagnetic particle can be absorbed by a wavelength-shifting compound (or molecule, element, etc.) which has been incorporated into the material forming the scintillator. Subsequently, a second electromagnetic particle can be generated and emitted by the wavelength-shifting compound. The second electromagnetic particle can have a second wavelength and further, the second electromagnetic particle can be emitted isotropically such that the direction of emission of the second electromagnetic particle is in a direction different to the angle of incidence of the first electromagnetic particle.

At 530, the presence of the second electromagnetic particle can be determined by a photomultiplier tube located at the scintillator.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An antineutrino detector, comprising:
a scintillator having a first end, a second end, and an external surface that extends between the first end and the second end, wherein the scintillator of the antineutrino detector includes a wavelength shifting material;
a screen positioned adjacent the external surface, the screen has a layer of lithium doped scintillator attached thereto; and
a photomultiplier tube positioned adjacent the first end of the scintillator, wherein:
the scintillator is configured to emit a neutron in response to an antineutrino interacting with a proton in the scintillator;
the lithium doped scintillator is configured to emit a first photon in response to the neutron being incident upon the lithium doped scintillator, wherein the first photon has a wavelength;
the wavelength shifting material of the scintillator is configured to absorb the first photon and emit a second photon responsive to absorbing the first photon, wherein the second photon has a second wavelength that is longer than the first wavelength; and
the photomultiplier tube is configured to generate a signal responsive to detecting the second photon, wherein the signal is indicative of the antineutrino interacting with the proton in the scintillator.

2. The antineutrino detector of claim 1, wherein the second photon is emitted from the wavelength shifting material isotropically, wherein a direction of emission of the second photon is disparate to an angle of incidence of the first photon with respect to the external surface of the scintillator.

3. The antineutrino detector of claim 1, wherein the screen surrounds the scintillator along its length.

4. The antineutrino detector of claim 1, further comprising a second photomultiplier tube positioned adjacent to the second end of the scintillator.

5. The antineutrino detector of claim 1, further comprising:
a second scintillator located adjacent to the scintillator, the scintillator and the second scintillator separated by the screen.

6. The antineutrino detector of claim 1, wherein the scintillator has a length of 2 meters.

7. The antineutrino detector of claim 1, wherein the first wavelength is between 440 and 500 nm.

8. The antineutrino detector of claim 1, wherein an air gap exists between the screen and the scintillator.

9. A method for detecting an antineutrino particle, comprising:
receiving the antineutrino particle at a scintillator material, the scintillator material comprises a proton, the antineutrino and the proton interacting to initiate an inverse beta-decay process causing a neutron and a positron to be emitted;

capturing the neutron at a screen located adjacent to the scintillator material, wherein the screen comprises a layer of material configured to capture the neutron and generate a first photon, wherein the first photon is emitted into the scintillator material;

converting the first photon to a second photon, wherein the first photon has a first wavelength and the second photon has a second wavelength, the second wavelength is longer than the first wavelength, and the converting is performed by a dopant in the scintillator material;

detecting the second photon, the second photon being detected by a photomultiplier tube attached to the scintillator material; and based upon detecting the second photon, generating an indication of the antineutrino being received at the scintillator material.

10. The method of claim 9, wherein the second photon is emitted isotropically by the dopant, wherein a direction of emission of the second photon is disparate to direction of travel of the first photon.

11. The method of claim 9, wherein the positron annihilates to form at least one gamma ray, wherein the gamma ray is subsequently absorbed by the scintillator material to form a third photon, wherein the third photon interacts with the dopant to form a fourth photon.

12. The method of claim 11, further comprising detecting the fourth photon at the photomultiplier tube, wherein the indication of the antineutrino being received at the scintillator material is further based upon the fourth photon being detected.

13. The method of claim 9, further comprising converting the neutron to a particle, and further converting the particle to form the first photon, whereby the converting of the neutron to the particle and the converting of the particle to the first photon occurring in the layer of material of the screen.

14. The method of claim 13, wherein the particle is one of an alpha particle or tritium.

15. An antineutrino detector, comprising:
a scintillator, wherein the scintillator is a cuboid, and the scintillator comprises an organic material comprising a proton, interaction of the proton with an antineutrino incident thereon initiates an inverse beta-decay process resulting in generation of a neutron and a positron;

a wavelength-shifting compound, the wavelength-shifting compound is configured to:
  absorb a first photon having a first wavelength and direction of travel; and
  responsive to absorbing the first photon, emit a second photon having a second wavelength that is longer than the first wavelength, wherein the second photon is emitted in a direction disparate to the direction of travel of the first photon; and a screen, wherein the screen is located adjacent to a long side of the scintillator, the screen includes a layer, wherein the layer is configured to capture the neutron and in response to capturing the neutron, emit the first photon.

16. The antineutrino detector of claim 15, wherein the layer includes a lithium-doped scintillator.

17. The antineutrino detector of claim 15, further comprising a photomultiplier tube configured to detect the second photon.

18. The antineutrino detector of claim 17, further comprising a second scintillator, wherein the second scintillator is located alongside the scintillator, the second scintillator has a second photomultiplier tube attached thereto, the scintillator and the second scintillator are separated by the screen.

19. The antineutrino detector of claim 15, further comprising a pair of photomultiplier tubes positioned on opposite ends of the cuboid.

20. The antineutrino detector of claim 15, wherein the first wavelength is between 440 and 500 nm.

* * * * *